US009563432B2

(12) United States Patent
Segelken et al.

(10) Patent No.: US 9,563,432 B2
(45) Date of Patent: Feb. 7, 2017

(54) DYNAMIC CONFIGURATION OF PROCESSING PIPELINE BASED ON DETERMINED TYPE OF FETCHED INSTRUCTION

(71) Applicant: NVIDIA Corporation, Santa Clara, CA (US)

(72) Inventors: Ross Segelken, Portland, OR (US); Darrell D. Boggs, Aloha, OR (US); Shiaoli Mendyke, Beaverton, OR (US)

(73) Assignee: Nvidia Corporation, Santa Clara, CA (US)

( * ) Notice: Subject to any disclaimer, the term of this patent is extended or adjusted under 35 U.S.C. 154(b) by 692 days.

(21) Appl. No.: 13/866,914

(22) Filed: Apr. 19, 2013

(65) Prior Publication Data

US 2014/0317382 A1 Oct. 23, 2014

(51) Int. Cl.
*G06F 9/30* (2006.01)
*G06F 15/76* (2006.01)
*G06F 9/38* (2006.01)

(52) U.S. Cl.
CPC ......... *G06F 9/3873* (2013.01); *G06F 9/30174* (2013.01)

(58) Field of Classification Search
CPC ............................. G06F 9/30036; G06F 9/455
See application file for complete search history.

(56) References Cited

U.S. PATENT DOCUMENTS

| 5,701,442 A | 12/1997 | Ronen |
| 5,774,686 A | 6/1998 | Hammond et al. |
| 5,903,760 A | 5/1999 | Farber et al. |
| 6,021,489 A | 2/2000 | Poplingher |
| 6,081,890 A | 6/2000 | Datta |
| 6,088,793 A | 7/2000 | Liu et al. |
| 6,105,124 A | 8/2000 | Farber et al. |
| 6,163,764 A | 12/2000 | Dulong et al. |
| 6,219,774 B1 | 4/2001 | Hammond et al. |
| 6,430,674 B1 | 8/2002 | Trivedi et al. |
| 6,542,981 B1 | 4/2003 | Zaidi et al. |
| 6,584,558 B2 | 6/2003 | Hammond et al. |
| 6,832,306 B1 | 12/2004 | Ganapathy et al. |
| 7,251,811 B2 | 7/2007 | Rosner et al. |
| 7,260,705 B2 | 8/2007 | Wang et al. |

(Continued)

*Primary Examiner* — Hyun Nam (57) ABSTRACT

Various embodiments relating to executing different types of instruction code in a micro-processing system are provided. In one embodiment, a micro-processing system includes a memory/storage subsystem configured to store non-native instruction set architecture (ISA) code and native ISA code in a common address space, fetch logic configured to retrieve the non-native ISA code and native ISA code from the common address space, instruction type determining logic configured to determine, at runtime, whether fetched instruction code is non-native ISA code or native ISA code, and processing logic configured to execute the fetched instruction code via a first pipeline configuration in response to the instruction type determining logic determining that the fetched instruction code is non-native ISA code, and via a second pipeline configuration which is different than the first pipeline configuration, in response to the instruction type determining logic determining that the fetched instruction code is native ISA code.

16 Claims, 3 Drawing Sheets

(56) References Cited

U.S. PATENT DOCUMENTS

| | | | | |
|---|---|---|---|---|
| 7,734,895 | B1* | 6/2010 | Agarwal | G06F 8/52 |
| | | | | 712/13 |
| 7,757,221 | B2 | 7/2010 | Zheng et al. | |
| 2002/0059268 | A1* | 5/2002 | Babaian | G06F 9/45504 |
| 2004/0015874 | A1* | 1/2004 | Ungar | G06F 11/3636 |
| | | | | 717/127 |
| 2009/0254709 | A1* | 10/2009 | Agesen | G06F 8/52 |
| | | | | 711/118 |
| 2011/0320766 | A1* | 12/2011 | Wu | G06F 9/30076 |
| | | | | 712/28 |
| 2013/0283249 | A1* | 10/2013 | Kanhere | G06F 8/40 |
| | | | | 717/139 |
| 2014/0281376 | A1* | 9/2014 | Yamada | G06F 9/3885 |
| | | | | 712/28 |

* cited by examiner

DYNAMIC CONFIGURATION OF PROCESSING PIPELINE BASED ON DETERMINED TYPE OF FETCHED INSTRUCTION

BACKGROUND

Processing pipelines in computing systems typically are designed to handle execution of code from a specific instruction set architecture (ISA). Accommodating code of different types (e.g., of different ISAs) within a processing pipeline can greatly increase the cost and complexity of the system. Particular challenges include efficiently storing and identifying different types of code, using different decode mechanisms, scheduling and sequencing operations, determining how and whether to have different instruction types in flight at the same time, etc.

DETAILED DESCRIPTION

The present disclosure provides mechanisms for using a micro-processing system to execute instruction code fetched from memory that is from different instruction set architectures (ISAs). In some embodiments, two types of architectural code may be executed, while in other examples, the system is operative to run non-native architectural code as well as native micro-architectural implementations of that code. The different types of code may be stored in a memory hierarchy of the micro-processing system. More particularly, instruction code that is of a non-native ISA and instruction code that is of a native ISA may be stored in a common address space of the memory hierarchy and executed by the micro-processing system. Non-native ISA code has to be decoded or translated in order to be executed by the micro-processing system, whereas native ISA code may be directly executed by the micro-processing system without having to be decoded or translated. Since both types of instruction code may be fetched from the common address space of the memory hierarchy, the micro-processing system may include mechanisms for making a determination of a type of fetched instruction code that may be performed at runtime or "on the fly" in order to determine a processing pipeline configuration or pathway with which to execute the fetched instruction code based on the determined instruction type. In other words, the micro-processing system may dynamically configure the processing pipeline differently to fetch and execute different types of instruction code. Note, in some cases, the determination of the code type may be performed prior to, or in parallel with, fetching the instruction code.

Depending on which the type of instruction code is fetched, very different amounts and/or types of operations may be performed to execute the fetched instruction code. For example, if the fetched instruction code is determined to be native ISA code, then the native ISA code may be executed with little or no meaningful use of hardware decoder logic. For example, micro-aliasing, branch type validation, and minor pre-decoding of field operations may be performed to ready the native ISA code for execution without need for decoding. In other words, the micro-processing system may direct the native instruction code through an execution path (or pipeline configuration) that does not include a hardware decoder pipe stage. If fetched instruction code is determined to be non-native ISA code, then such non-native ISA code may require decoding into native ISA code to be appropriately executed by execution units of the processing pipeline. To this end, the micro-processing system may direct the non-native ISA code through an execution path (or pipeline configuration) that includes a hardware decoder pipe stage (or multiple pipe stages) that decodes the non-native ISA code into native ISA code.

Furthermore, in embodiments where non-native code requires address translation to determine the physical address of the code, the non-native ISA code may be identified with a linear address and the native ISA code may be identified with a physical address. The micro-processing system may direct the non-native ISA code through an execution path (or pipeline configuration) that includes an address translation pipe stage (or multiple pipe stages) that translates the linear address into a physical address. On the other hand, the micro-processing system may direct the native ISA code through an execution path (or pipeline configuration) that does not include an address translation stage, since the non-native ISA code has a physical address that does not require translation.

The non-native ISA code and the native ISA code may be directed through different processing paths in the front-end of the micro-processing system that have a different number of pipe stages, a different sequence of pipe stages and/or different processing operations in order to prepare the fetched instruction code for execution. At some point, the two different processing paths may be rejoined. The micro-processing system may be configured to perform arbitration or flow control of the two paths as they rejoin such that it keeps both types of the fetched instructions in order with respect to the sequencing present when the paths diverged. In this manner, the micro-processing system can efficiently handle and execute both types of instruction code in the processing pipeline at the same time.

Figure 1:
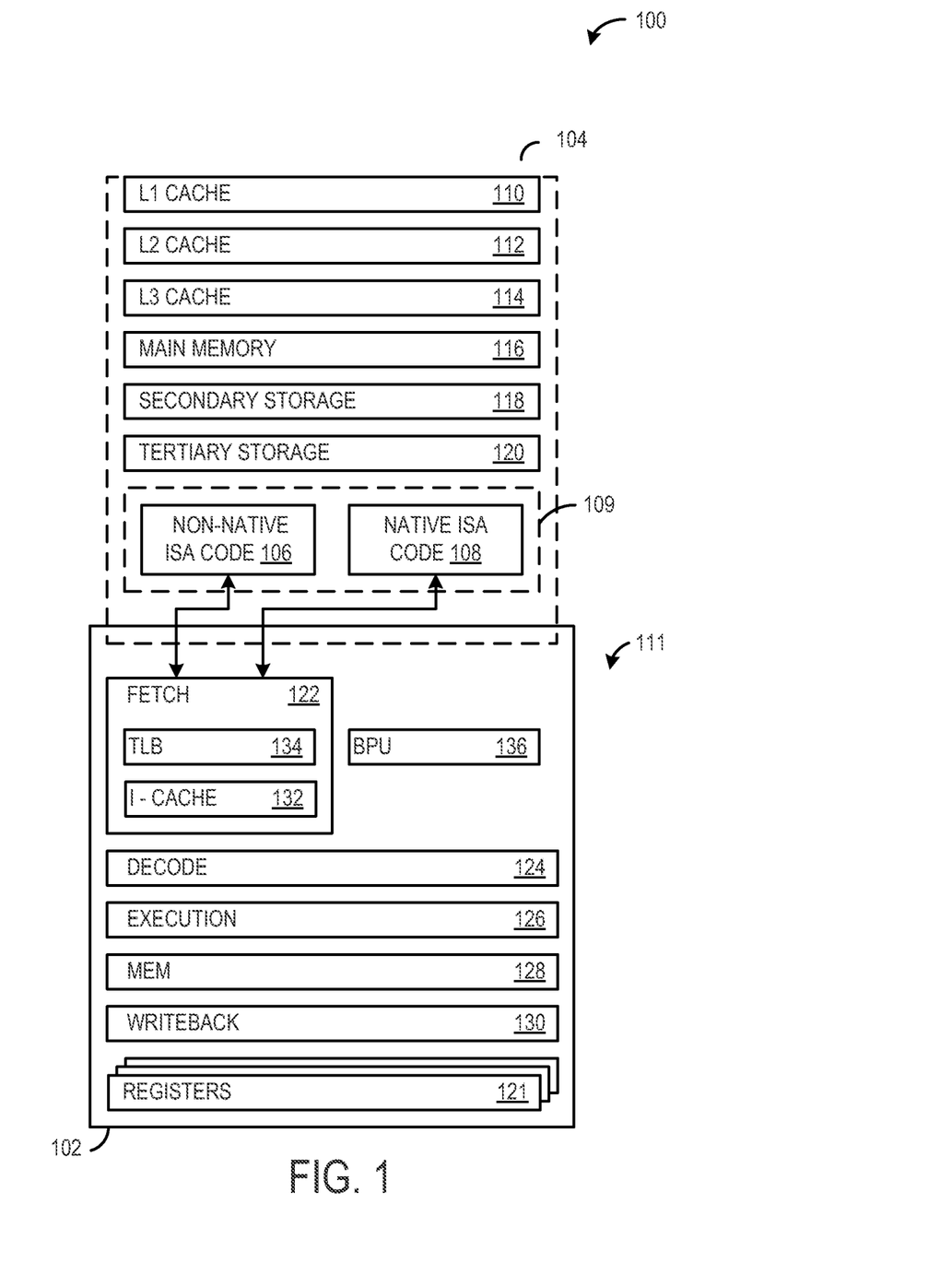
FIG. 1 schematically shows an example computing system in accordance with an embodiment of the present disclosure.

FIG. 1 shows aspects of an example micro-processing and memory system 100 (e.g., a central processing unit or graphics processing unit of a personal computer, game system, smartphone, etc.) including processor core 102. Although the illustrated embodiment includes only one processor core, it will be appreciated that the micro-processing system may include additional processor cores in what may be referred to as a multi-core processing system. Microprocessor core/die 102 variously includes and/or may communicate with various memory and storage locations of a memory hierarchy that form a memory/storage subsystem 104. For example, instruction code may be stored in the memory hierarchy. In particular, non-native ISA code 106 and native ISA code 108 may share a common address space 109 of the memory hierarchy. In some cases, it will be desirable to allocate a portion (sometimes referred to as a "carveout") of memory that is secure and private such that it is invisible to the user and/or non-native ISA code. Various data and software may run from, and/or be stored in said allocation, such as the native ISA instruction code, a software layer and related software structures.

In the illustrated embodiment, the processor core may include processor registers 121. Further, the memory hierarchy may include L1 processor cache 110, L2 processor cache 112, L3 processor cache 114, main memory 116 (e.g., one or more DRAM chips), secondary storage 118 (e.g., magnetic and/or optical storage units) and/or tertiary storage 120 (e.g., a tape farm). At least some memory may be located off-chip, and some memory may be located on-chip. Some or all of these locations may be memory-mapped, though in some implementations the processor registers may be mapped differently than the other locations, or may be implemented such that they are not memory-mapped. Fetching different types of instruction code from memory through different types of memory mapping with be discussed in further detail below.

It will be understood that the memory/storage components are listed above in increasing order of access time and capacity, though there are possible exceptions. In some embodiments, a memory controller may be used to handle the protocol and provide the signal interface required of main memory 116, and, typically, to schedule memory accesses. The memory controller may be implemented on the processor die or on a separate die. It is to be understood that the locations set forth above are non-limiting and that other memory/storage locations may be used instead of, or in addition to, those described above without departing from the scope of this disclosure.

Microprocessor 102 includes a processing pipeline or processing logic 111 comprising a plurality of processing pipe stages which typically include one or more of fetch logic 122, decode logic 124 (referred to herein as a hardware decoder, a hardware decode stage, or hardware decode logic (HWD)), execution logic 126, mem logic 128, and writeback logic 130. Note that one or more of the pipe stages in the processing pipeline may be individually pipelined to include a plurality of stages to perform various associated operations. It should be understood that these five stages are somewhat specific to, and included in, a typical RISC implementation. More generally, a microprocessor may include fetch, decode, and execution logic, with mem and writeback functionality being carried out by the execution logic. The present disclosure is equally applicable to these and other microprocessor implementations, including hybrid implementations that may use VLIW instructions and/or other logic instructions.

Fetch logic 122 may be configured to retrieve instruction code from one or more locations of the memory hierarchy (e.g., unified or dedicated L1 caches backed by L2-L3 caches and main memory). In one example, both non-native ISA code and native ISA code may be stored in a common address space of the memory/storage system, and correspondingly an instruction cache (e.g., dedicated L1 cache) can be shared by both types of instruction code.

In order to differentiate between the two different types of instruction code, one or more pipe stages of the processing pipeline may include instruction type determining logic configured to determine, at runtime, whether fetched instruction code is non-native ISA code or native ISA code. In one example, an instruction-type bit may be associated with each code portion. The instruction type determining logic may be configured to look up the instruction-type bit to determine a code type. For example, if the bit is cleared then the associated code portion is non-native ISA code, and if the bit is set then the associated code portion is native ISA code. In some embodiments, the instruction-type bit may be included as part of a cacheline tag. In some embodiments, a version of the instruction-type bit associated with the instruction code may be stored in each pipe stage of the processing pipeline. In some embodiments, the instruction type determining logic may be included in each stage of the processing pipeline to determine different types of instruction code. As such, different types of instruction code may be present in different stages of the processing pipeline at the same time, and the pipe stages may be dynamically configured to handle the different types of instruction code. For example, the instruction-type bit may allow the fetch logic to dynamically adjust to the amount of non-native code vs. native code that has recently been fetched and stored in the instruction cache. At times, the instruction cache may be filled with mostly (or exclusively) native code, while at other times the instruction cache may be filled with mostly (or exclusively) non-native code.

In some embodiments, at least some portion of the memory hierarchy may be physically indexed. For example, the fetch logic may include an instruction cache 132 that may be physically indexed. In such embodiments, redirections to the non-native ISA code may be to linear addresses while redirection to native ISA code may be to physical addresses. Accordingly, the fetch logic may include address translation logic 134 (e.g., a translation lookaside buffer (TLB)) configured to translate a linear address into a physical address before fetching non-native ISA code from a linear address specified by a branch. This configuration allows the fetch logic to fetch native ISA code from the instruction cache more quickly (and with less power) than non-native ISA code. In other configurations, such as a configuration with a virtually indexed cache, the address translation logic may be configured to translate the linear address into a physical address in parallel with a lookup of the instruction cache. In such configurations, there may not be the same performance difference, but a similar power savings may be realized.

In some embodiments, the micro-processing system may be configured to generate native ISA code that includes translations of corresponding portions of non-native ISA code. For example, a native translation of non-native ISA code may be created by a translation system that is executed by a software layer of the micro-processing system. Typically, a native translation may be executed faster and more efficiently than the corresponding non-native ISA code. However, there may be substantial overhead costs associated with generating an optimized native translation of non-native ISA code. Accordingly, a native translation may be generated for portions of non-native ISA code that are executed frequently or consume substantial processing time, such as frequently used or "hot" loops or functions. In some embodiments, code portions of non-native ISA code may be profiled in order to identify whether and how those code portions should be included in new or reformed translations. For example, profiled code portions may be identified and defined by taken branches. In another example, a translation may be generated for a portion of non-native ISA code in response to that code portion being executed a threshold number of times.

During operation, the existence of a translation of a corresponding piece of nonnative ISA code may be determined using an on-core hardware redirector that may be included in the front-end (e.g., fetch logic) of the micro-processing system. The hardware redirector may be a micro-architectural structure that includes address information or mappings sufficient to allow the processing pipeline to retrieve and execute a translation or a portion thereof associated with non-native ISA code via address mapping. Each entry in the hardware redirector may be associated with a translation, and provides redirection information that enables the microprocessing system, during a fetch operation for a selected code portion, to cause execution to be redirected away from that code portion and to its associated translation. Note that the hardware redirector is merely one example of a mechanism for locating and executing translations, and it will be appreciated that the processor hardware and/or software may include other mechanisms for locating and executing translations without departing from the scope of the present description. It will be appreciated that determinations of whether native translations exist for corresponding portion of non-native ISA code may be performed before, in parallel with, or after address translation when applicable without departing from the scope of the present disclosure.

The different ways in which the fetch logic operates to fetch the different types of instruction code demonstrate how the processing pipeline may be configured differently to execute different types of instruction code. In this instance, the processing pipeline configuration differs by changing operation of the fetch logic pipe stage depending on whether the instruction code is native ISA code or non-native ISA code. In particular, a first pipeline configuration may include an address translation stage to translate linear addresses of non-native ISA code into physical addresses. On the other hand, a second pipeline configuration through which the micro-processing system directs native ISA code does not include such an address translation stage.

In some embodiments, a branch prediction unit (BPU) 136 in the front-end may handle branches from both non-native ISA code and native ISA code. When the branch predictor predicts a taken branch in either ISA, the BPU may predict a state of the instruction-type bit associated with the predicted target. In particular, the BPU may store an instruction-type bit for each target address stored in prediction structures. For example, these instruction-type bit and target address pairs may be provided to the BPU when it is trained by branch validation hardware. When the BPU accurately predicts branches, the front-end of the micro-processing system may transition between instruction code from the non-native ISA and native ISA seamlessly, while avoiding bubbles on transitions between the ISAs that would decrease performance.

After determining the type of the fetched instruction code based on, for example, the instruction-type bit, the processing pipeline may be configured differently based on the determined instruction type. Specifically, different operations may be performed in the fetch and decode pipe stages based on type before it ultimately is presented to downstream portions of the execution pipeline, among other things.

In a first configuration or pathway, the HWD 124 is utilized to receive and decode (e.g., by parsing opcodes, operands, and addressing modes, etc.) target ISA or non-native ISA code 106 into native instructions for execution via the execution logic 126. Specifically, because the fetched instructions are of non-native ISA code, they are routed through the HWD in order to generate corresponding native instructions that can be scheduled for execution by the execution logic.

In a second configuration or pathway, the native ISA code 108 is retrieved and executed without use of the HWD. In some cases, the native instructions may include a translation of a piece of code that corresponds to non-native instructions, and may also include other parts of the translation system itself. A native translation may cover and provide substantially equivalent functionality for any number of portions of corresponding non-native ISA code 106. The corresponding native translation is typically optimized to some extent by the translation software relative to the corresponding non-native code that would be dispatched by the HWD. However, it will be understood that a variety of optimizations and levels of optimization may be employed.

The specific examples herein refer to whether or not a hardware decoder will be used for fetched instruction code. It will be appreciated, however, that pipeline configurations for different code types may differ in other ways. Generally, the present description encompasses, to account for different types of fetched code, using a different number of pipe stages, changing operation of one or more pipe stages to execute the fetched instruction code, or changing a sequence of pipe stages to execute the fetched instruction code.

Once the fetched instruction code has been decoded or otherwise prepared for execution, the two pathways may converge. The front-end of the micro-processing system may perform flow control of the two paths as they rejoin such that it keeps the fetched instructions from both paths in order with respect to the order when the paths diverged, and the instruction code may be executed by the execution stage 126. In particular, the instructions may be executed by an execution pipeline, and the results may be written to memory 128 when appropriate.

Figure 2:
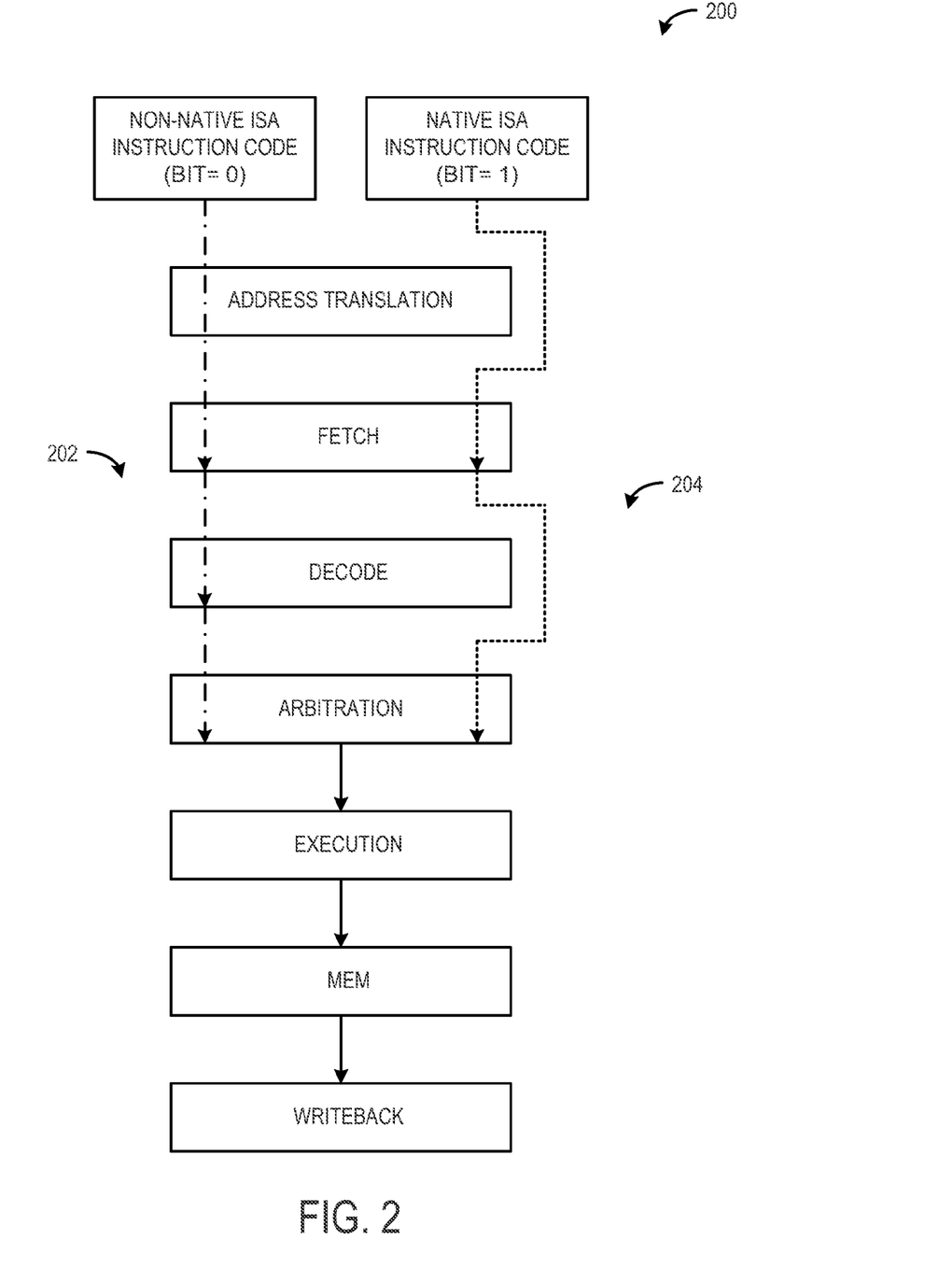
FIG. 2 shows an example of different processing configurations or paths for executing different types of fetched instruction code in a processing pipeline.

FIG. 2 shows an example of different processing configurations or paths for executing different types of fetched instruction code in a processing pipeline 200. The processing pipeline may include a plurality of pipe stages or logical blocks that perform different processing operations.

A first pipeline path or configuration 202 is associated with a first type of instruction code that is non-native ISA code. The instruction code may be identified as non-native ISA code by an instruction-type bit being cleared (e.g., BIT=0). The instruction-type bit may be stored in each pipe stage of the first pipeline configuration, so that each pipe stage may be configured on the fly to accommodate the particular type of instruction code.

In this example, the instruction cache of the micro-processing pipeline is physically indexed, the non-native ISA code is identified with a linear address, and the native code is identified with a physical address. As such, the first pipeline path or configuration includes an ADDRESS TRANSLATION stage that translates the linear address of the non-native ISA code into a physical address. Once the address is translated, the first pipeline path is directed through a FETCH stage to fetch the non-native ISA code from the physical address in memory. Although the ADDRESS TRANSLATION stage is shown before the FETCH stage in the illustrated processing pipeline, it will be appreciated that the address translation may be performed in parallel with the instruction fetch, in some embodiments. Since the fetched instruction code is identified as non-native ISA code, the non-native ISA code is directed through a DECODE processing stage of the first pipeline configuration that uses the HWD in order to decode the non-native ISA code into native ISA code, among other operations.

The second pipeline path or configuration 204 is associated with a second type of instruction code that is native ISA code. The instruction code may be identified as native ISA code by the instruction-type bit being set (e.g., BIT=1). The instruction-type bit may be stored in each pipe stage of the second pipeline configuration, so that each pipe stage may be configured on the fly to accommodate the particular type of instruction code.

Since the instruction code is identified as native ISA code that is identified with a physical address, the native code is directed through the second pipeline configuration that bypasses the ADDRESS TRANSLATION stage and moves directly to the FETCH stage to fetch the native ISA code from the physical address in memory. Next, the second pipeline configuration bypasses the DECODE processing stage since the HWD does not need to be utilized for the native ISA code. In one example, for the native ISA code, only micro-aliasing, branch type validation, and minor pre-decode of fields for scheduling are performed.

The two configurations or paths rejoin after the DECODE stage at an ARBITRATION stage that is configured to perform flow control of the two paths as they rejoin such that it keeps the fetches from both sides in order with respect to the order when the paths diverged. In other words, when a portion of native ISA code is fetched after a portion of non-native ISA code, the arbitration stage is configured to cause the entire portion of non-native ISA code to be dispatched for execution before dispatching for execution any of the portion of native ISA code. Due to the shorter path on the native side, the performance of native ISA code typically will be higher than the performance of the non-native ISA code. By directing different types of code portions through different pipeline configurations, overall performance of the system may be increased due to the fact that the configurations may be tuned to the particular processing needs of the instruction type.

Figure 3:
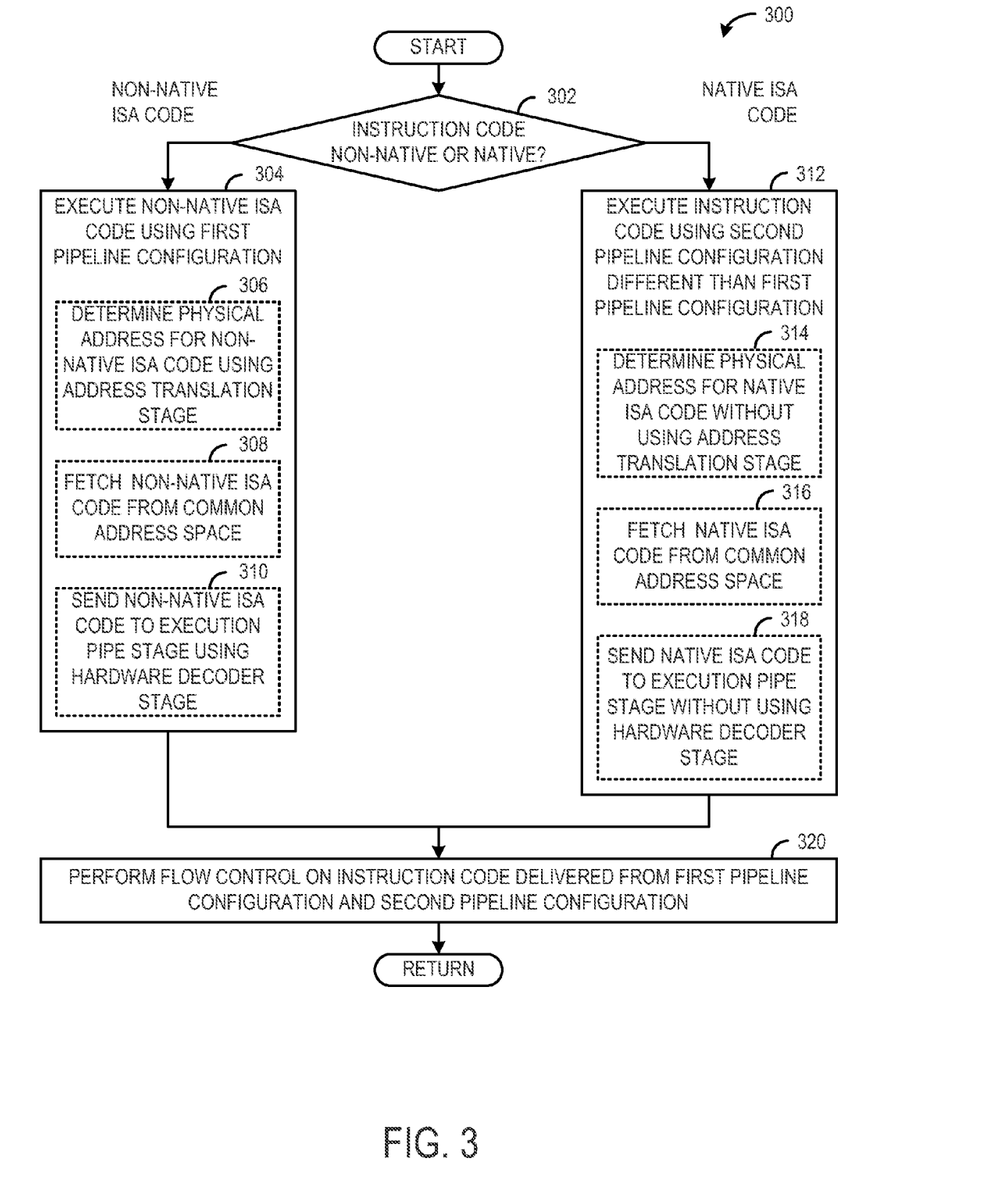
FIG. 3 shows an example of a method for using a micro-processing system to execute multiple different types of code in accordance with an embodiment of the present disclosure.

FIG. 3 shows an example of a method 300 for using a micro-processing system to execute multiple different types of code in accordance with an embodiment of the present disclosure. The method 300 may be implemented with any suitable software/hardware, including configurations other than those shown in the foregoing examples. In some cases, however, the process flows may reference components and processes that have already been described. For purposes of clarity and minimizing repetition, it may be assumed that these components/processes are similar to the previously described examples.

At 302, the method 300 includes determining whether fetched instruction code is a first type of instruction code that is non-native ISA code or a second type of instruction code that is native ISA code. The determination may be made at runtime, on the fly, and at any time when the instruction code is in the processing pipeline. In some embodiments, the method may include associating an instruction-type bit with the fetched instruction code in order to determine the type of code. The instruction-type bit may encode whether the fetched instruction code is of a first type or a second type. More particularly, if the instruction-type bit is cleared, then the fetched instruction code may be a first type of code that is non-native code. If the instruction-type bit is set, then the fetched instruction code may be a second type of code that is native code. If the fetched instruction code is native ISA code, then the method 300 moves to 312. Otherwise, the method 300 moves to 304.

At 304, the method 300 includes executing the fetched instruction code using a first pipeline configuration. In some embodiments where an instruction cache is physically indexed, at 306, the method may include determining a physical address for the non-native ISA code using an address translation stage to translate a linear address of the non-native ISA code to a physical address. In some embodiments, at 308, the method 300 may include fetching the non-native ISA code from a common address space where native ISA code is also stored. In some embodiments, at 310, the method 300 may include sending the non-native ISA code to the execution pipe stage using a hardware decoder pipe stage. The hardware decoder pipe stage may decode the non-native ISA code into native instruction code.

At 312, the method 300 includes executing the fetched instruction code using a second pipeline configuration that differs from the first pipeline configuration. The second pipeline configuration may differ from the first pipeline configuration by executing the fetched instruction code using one or more of a different number of pipe stages, changing operation of one or more pipe stages to execute the fetched instruction code, and changing a sequence of pipe stages to execute the fetched instruction code. In some embodiments, at 314, the method 300 may include determining a physical address for native ISA code without using an address translation stage. In particular, the address translation stage may be bypassed because the native ISA code already has a physical address. In some embodiments, at 316, the method 300 may include fetching the native ISA code from a common address space where non-native ISA code is also stored. In some embodiments, at 318, the method 300 may include sending the native ISA code to the execution pipe stage without using a hardware decoder pipe stage.

At 320, the method 300 includes performing flow control on code delivered via the first pipeline configuration and the second pipeline configuration. For example, flow control may include when a portion of native ISA code is fetched after a portion of non-native ISA code, all of the portion of non-native ISA code may be dispatched for execution before dispatching for execution any of the portion of native ISA code.

By dynamically directing different types of instruction code through different processing pipeline paths or dynamically configuring a processing pipeline differently according to an instruction type, the micro-processing system may be capable of executing different types of instruction code, and performance of execution may be increased, in some cases. For example, due to the shorter processing path for the native code, the performance of native ISA code typically may be higher that non-native ISA code. Moreover, transitioning between ISAs may be smoothed and processing bubble may be reduced.

While the depicted method may be performed in connection with any suitable hardware configuration, it will be appreciated that modifications, additions, omissions, and refinements may be made to these steps in accordance with method descriptions included above and described with references to the mechanisms, hardware, and systems shown in FIGS. 1-3.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A micro-processing system, comprising:
   a memory/storage subsystem configured to store instruction code comprising non-native instruction set architecture (ISA) code and native ISA code in a common address space;
   a processing pipeline comprising:
      fetch logic configured to fetch portions of the instruction code from the common address space, the fetch logic comprising address translation logic;

instruction type determining logic configured to determine, at runtime, which of the portions of fetched instruction code are non-native ISA code;

decode logic downstream of the fetch logic and operable for decoding non-native ISA code into native ISA code;

an arbitration stage downstream of the decode logic; and execution logic downstream of the decode logic;

wherein the micro-processing system uses a first configuration of the processing pipeline to process portions of the fetched instruction code that are non-native ISA code in response to determining that those portions are non-native ISA code, wherein otherwise the micro-processing system uses a second configuration of the processing pipeline to process the portions of the fetched instruction code that are native ISA code;

wherein the first configuration comprises: the fetch logic including the address translation logic; the decode logic; the arbitration stage; and the execution logic; and wherein the second configuration comprises: the fetch logic but the address translation logic is bypassed; the arbitration stage; and the execution logic, wherein the decode logic is bypassed in the second configuration;

wherein the arbitration stage is operable for merging native ISA code output from the decode logic and native ISA code output from the fetch logic for execution by the execution logic.

2. The micro-processing system of claim 1, where the non-native ISA code is identified with a linear address and the native ISA code is identified with a physical address, where the address translation logic translates the linear address into a physical address.

3. The micro-processing system of claim 1, where the native ISA code in the memory/storage subsystem includes native translations of corresponding portions of non-native ISA code.

4. The micro-processing system of claim 1, where the instruction type determining logic is configured to determine which of the portions of fetched instruction code are non-native ISA code according to an instruction-type bit corresponding to the portions of fetched instruction code.

5. The micro-processing system of claim 4, where the instruction-type bit corresponding to the portions of fetched instruction code is stored in each stage of the processing pipeline.

6. The micro-processing system of claim 1, wherein the arbitration stage merges the native ISA code output from the decode logic and the native ISA code output from the fetch logic in order with respect to the order in which the non-native ISA code and the native ISA code were fetched from the memory/storage subsystem.

7. A micro-processing system, comprising:

a memory/storage subsystem configured to store non-native instruction set architecture (ISA) code and native ISA code in a common address space;

fetch logic configured to fetch instruction code comprising non-native ISA code and native ISA code from the common address space and into an instruction cache, the fetch logic comprising a address translation stage, wherein the address translation stage is used to fetch non-native ISA code from the memory/storage subsystem and is not used to fetch native ISA code from the memory/storage subsystem;

instruction type determining logic configured to determine, at runtime, whether the fetched instruction code is non-native ISA code; and a plurality of processing pipe stages including a hardware decoder stage downstream of the fetch logic and operable for decoding non-native ISA code into native ISA code, the plurality of processing pipe stages also including an arbitration stage downstream of the hardware decoder stage and further including execution logic downstream of the arbitration stage, the plurality of processing pipe stages being configured to process the fetched instruction code using the hardware decoder stage if the fetched instruction code is non-native ISA code and to process the fetched instruction code without using the hardware decoder stage if the fetched instruction code is of native ISA code, wherein the arbitration stage is operable for merging native ISA code output from the hardware decoder stage and native ISA code output from the fetch logic for execution by the execution logic.

8. The micro-processing system of claim 7, where the non-native ISA code is identified with a linear address and the native ISA code is identified with a physical address, where the address translation stage to translate the linear address into a physical address.

9. The micro-processing system of claim 7, where the native ISA code in the memory/storage subsystem includes native translations of corresponding portions of non-native ISA code.

10. The micro-processing system of claim 7, where the instruction type determining logic is configured to determine whether the fetched instruction code is non-native ISA code or native ISA code according to an instruction-type bit corresponding to the fetched instruction code.

11. The micro-processing system of claim 10, where the instruction-type bit corresponding to the fetched instruction code is stored in each processing pipe stage of the plurality of processing pipe stages.

12. The micro-processing system of claim 7, wherein the arbitration stage merges the native ISA code output from the hardware decoder stage and the native ISA code output from the fetch logic in order with respect to the order in which the non-native ISA code and the native ISA code were fetched from the memory/storage subsystem.

13. A method of using a micro-processing system to execute multiple different types of code, the method comprising:

fetching instruction code comprising non-native instruction set architecture (ISA) code and native ISA code into an instruction cache from a common address space of a memory/storage subsystem of the micro-processing system that is configured to store non-native ISA code and native ISA code, where the non-native ISA code is identified with a linear address and the native ISA code is identified with a physical address, wherein the fetching comprises translating the linear address into a physical address;

receiving the fetched instruction code into a plurality of pipeline stages comprising a hardware decoder stage, an arbitration stage downstream of the hardware decoder stage, and execution logic;

determining, at runtime, portions of the fetched instruction code that are non-native ISA code;

if non-native ISA code, processing the non-native ISA code using a first configuration of the plurality of pipeline stages that uses the hardware decoder stage to decode the non-native ISA code into native ISA code and then directs the native ISA code decoded by the hardware decoder stage to the arbitration stage;

if native ISA code, processing the native ISA code using a second configuration of the plurality of pipeline stages that bypasses the hardware decoder stage and directs the native ISA code from the instruction cache to the arbitration stage;

at the arbitration stage, merging the native ISA code from the hardware decoder stage and the native ISA code that bypassed the hardware decoder stage to generate merged native ISA code; and executing the merged native ISA code using the execution logic.

14. The method of claim 13, where the native ISA code in the memory/storage subsystem includes native translations of corresponding portions of non-native ISA code.

15. The method of claim 13, where portions of the fetched instruction code are determined to be non-native ISA according to an instruction-type bit corresponding to the fetched instruction code.

16. The method of claim 13, wherein the arbitration stage merges the native ISA code output from the hardware decoder stage and the native ISA code output that bypassed the hardware decoder stage in order with respect to the order in which the non-native ISA code and the native ISA code were fetched from the memory/storage subsystem.

* * * * *